(No Model.)
C. EVEN.
LAWN MOWER GRASS RECEPTACLE.
No. 474,234. Patented May 3, 1892.
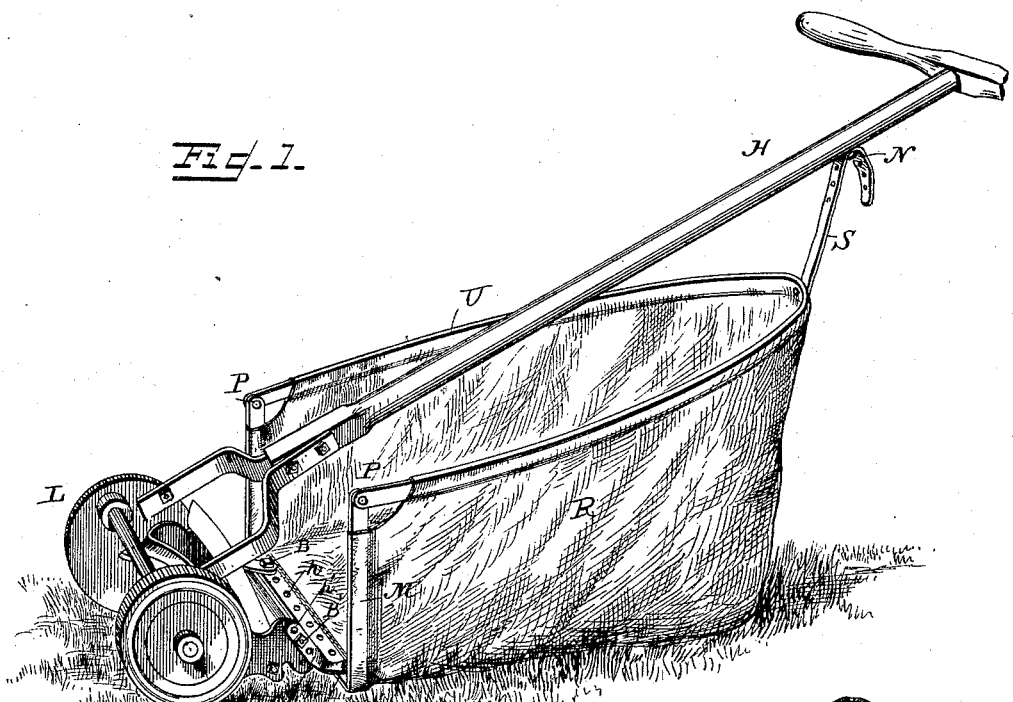
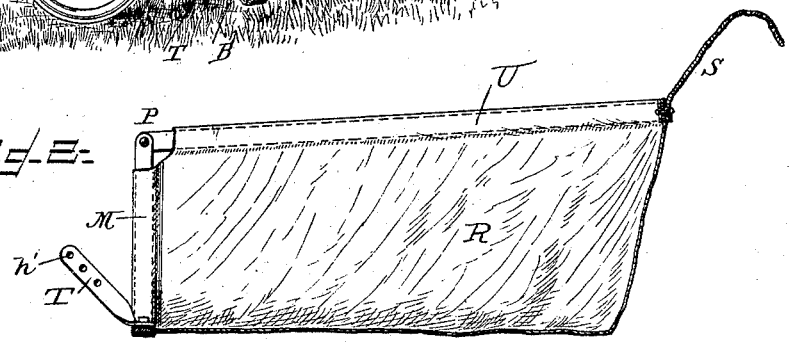
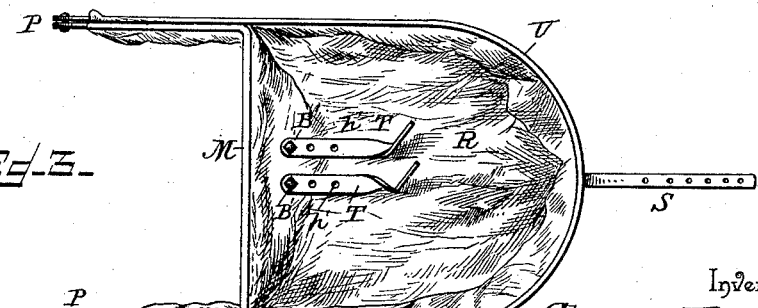
Witnesses
Chas H. Ourand
N.P. Collamer
Inventor
Charlie Even
By his Attorneys,
C.A. Snow & Co.

UNITED STATES PATENT OFFICE.

CHARLIE EVEN, OF DAVENPORT, IOWA.

LAWN-MOWER GRASS-RECEPTACLE.

SPECIFICATION forming part of Letters Patent No. 474,234, dated May 3, 1892.

Application filed October 26, 1891. Serial No. 409,915. (No model.)

*To all whom it may concern:*

Be it known that I, CHARLIE EVEN, a citizen of the United States, residing at Davenport, in the county of Scott and State of Iowa, have invented a new and useful Lawn-Mower Attachment, of which the following is a specification.

This invention relates to lawn-mowers; and the object of the same is to produce an improved attachment for lawn-mowers whereby the grass cut thereby will be collected and harvested.

To this end the invention consists in an adjustable folding attachment of the general construction and arrangement hereinafter more fully described and claimed, and as illustrated on the sheet of drawings, wherein—

Figure 1 is a general perspective view of a lawn-mower with my attachment applied. Fig. 2 is an enlarged central longitudinal section of the attachment alone. Fig. 3 is a plan view of this improved attachment folded as for storage or transportation.

Referring to the said drawings, the letter L designates a lawn-mower of any approved pattern, having an operating-handle H, by which it may be pushed over the lawn to cut the grass thereof.

My improved attachment comprises a main member M at the mouth of the device, whose body travels near the ground and adjacent the mower, and whose ends rise about vertical from the body, a U-shaped upper member U, whose ends are pivoted, as at P, outside and to the ends of the main member, and whose bend is supported by a strap S, which connects with a hook or nail N on the under side of the handle H, and a canvas bag or receptacle R, whose hemmed edges are turned over these members in the manner shown, so that the mouth and the upper side of the device shall be open. The body of member M is provided with a number of holes $h$, through two of which are passed bolts B, securing the inner ends of short metallic straps T to this member, and each of said straps is twisted so that its outer end stands in a vertical plane. Said end is provided with a number of holes $h'$, through one of which may be passed a bolt or set-screw B', whereby the device may be connected to the body of the lawn-mower, as shown in Fig. 1.

All parts of this device are preferably of metal, except the canvas, and even that may be of wire fabric, if desired, although I prefer to make it of canvas or other flexible fabric, so that when disconnected from the mower the attachment may be folded, as seen in Fig. 3, the metallic straps being then removed and packed inside, if desired, so that the whole can be put into a small box and sold as an article of manufacture. The strap S may also be of metal, if desired, although I prefer leather, and it should have several holes to engage the nail, so that the angle of the attachment can be adjusted.

In applying the device to a lawn-mower the latter must first be provided with holes for the bolts B'. The straps T are secured to the main member M in the proper holes $h$ to bring the straps against the ends of the mower, and then the bolts B' are put in place. The strap S is then connected with the handle, so as to set the attachment at the desired angle, and the mower is pushed over the lawn, and the grass that is cut will fly from the mower directly into the attachment. At the end of each trip across or around the lawn the accumulated grass is dumped in a pile, and hence the attachment serves the purpose of a rake, gathering the grass as fast as it is cut.

What is claimed as new is—

1. As an article of manufacture, an attachment for lawn-mowers, comprising a main member having a horizontal body provided with a number of holes and upturned ends, a U-shaped upper member, its ends pivotally connected with the ends of the main member, a flexible receptacle secured to said members and open at the top, a strap rising from the bend of the upper member, and two twisted metallic straps, each bolted into one of the holes in said body and having a number of holes through its outer end.

2. In an attachment for lawn-mowers, a frame comprising an upper elongated U-shaped member having its front ends pivotally attached to the vertical portion of the front member of said frame, a piece of flexible material attached to and enveloping the sides, one end, and bottom of the said attachment and having the front end entirely open, a strap connected to the rear portion of the upper member of said frame, adapted to be adjustably attached to the handle of a lawn-mower, and metallic straps adjustably secured to the front member of said frame and having their ends bent at such an angle as to be readily attached to a lawn-mower, substantially as described.

In testimony that I claim the foregoing as my own I have hereto affixed my signature in the presence of two witnesses.

CHARLIE EVEN.

Witnesses:
   H. T. BUSHNELL,
   W. L. DAVIS.